United States Patent [19]

Hesse

[11] Patent Number: 4,988,033
[45] Date of Patent: Jan. 29, 1991

[54] REPAIR OF FLIGHT BARS
[75] Inventor: Friedhelm E. Hesse, Canonsburg, Pa.
[73] Assignee: Advanced Longwall Equipment, Inc., Houston, Pa.
[21] Appl. No.: 386,890
[22] Filed: Jul. 28, 1989
[51] Int. Cl.⁵ .............................................. B23K 31/02
[52] U.S. Cl. ................................... 228/119; 228/170; 228/165; 29/DIG. 73; 29/402.13
[58] Field of Search ............... 228/119, 165, 168–171; 29/DIG. 73, 402.09, 402.13, 402.16, 156.8 B; 299/80, 91

[56] References Cited

U.S. PATENT DOCUMENTS

| | | | |
|---|---|---|---|
| 1,406,110 | 2/1922 | Troutner | 228/119 |
| 3,145,461 | 8/1964 | Mattingly | 29/402.13 |
| 3,243,874 | 4/1966 | Royer | 29/402.13 |
| 3,755,877 | 9/1973 | Thompson | 29/402.13 |
| 4,059,884 | 11/1977 | Weill | 228/165 |
| 4,478,425 | 10/1984 | Benko | 29/402.13 |
| 4,819,990 | 4/1989 | Breuer et al. | 228/119 |

FOREIGN PATENT DOCUMENTS 2829448  1/1980  Fed. Rep. of Germany ... 29/402.13

Primary Examiner—Sam Heinrich
Attorney, Agent, or Firm—Webb, Burden, Ziesenheim & Webb

[57] ABSTRACT

A method of reparing a worn flight bar is accomplished by first removing by torch cutting the worn ends of the flight bar. Replacement endpieces having an outer surface profile matching that of a new flight bar and an inner face configured to match to match the cut face of the flight bar ends are secured thereto by welding. Each profiled replacement endpiece is preferably formed by drop forging and contains welding chamfers and seating lands formed around the inner face thereof to insure strong weld joints and reproducible dimensional accuracy.

11 Claims, 2 Drawing Sheets

REPAIR OF FLIGHT BARS

BACKGROUND OF THE INVENTION

The invention relates generally to methods of repairing worn wear parts and, more particularly, to the refurbishment of worn flight bars used in chain scraper conveyors to transport coal in longwall mining, for example. It is common in longwall mining to transport the cut coal from the shearing face of the seam by way of a so-called armored face conveyor or "AFC" in order to move high tonnages of coal from the area of the mining machine to a main conveyor belt and, thence, out of the mine. A typical AFC is made up of a number of interconnected line pans having profiled side channel guides, commonly referred to as "sigma sections", so named due to the close similarity of their cross-sectional configuration with that of the capital Greek letter. A plurality of elongated flight bars, interconnected by one or two continuous chains, slide along the line pans to move the cut coal therein. The ends of the flight bars are specially contoured to slidably fit within the contoured sigma sections of the line pans and are guided with minimum friction therein, while wedging of material is also minimized. The flight bars are slidably dragged along the line pan by the attached endless chains which, in turn, are driven by powerful motors.

As can be appreciated, there is a great deal of sliding contact between the profiled ends of the flight bars and the similarly contoured and closely fitting sigma sections of the line pans. In order to minimize wear and damage to the more expensive line pan, the sigma sections generally are hardened to a higher degree than the profiled flight bar ends. Thus, after a period of time, the softer end portions of the flight bars become worn down to a degree that excessive clearances develop between the flight bar end portions and the sigma sections and the required guidance provided by the sigma sections is no longer present. When this condition develops, the worn flight bars shift and misalign which can cause serious line breakage and equipment shutdown if the problem is not corrected.

Heretofore, it has been common practice in the coal mining industry to remove and scrap the worn flight bars and replace them with flight bars in a newly manufactured condition. Needless to say, this is an expensive practice which has received some considerable attention in the past, but has yet to be rectified until the present invention.

As stated, prior attempts to repair worn flight bars have not proved entirely successful. One such repair method proposed to build-up or reconstruct the worn tips by hardforming, that is, by direct weld deposition on the worn areas of the flight bar. If the amount of deposited weld material becomes too great in certain areas, it has been found that the hardness of the surface coating will vary, which proves troublesome due to differential wearing. It is also very expensive and difficult to duplicate the complex surface profile geometry of the original flight bar tip by welding or hardforming. When the original tip profile is not duplicated to a substantial degree, the repaired flight bar will cause objectionable increased wear or jamming in the profiled sigma sections of the line pans. Hence, the desired smooth running chain scraper operation will not be realized.

Prior attempts to repair worn flight bars have also utilized a method in which the worn tips were cut off in a straight cut and then a flat faced, bar shaped tip was welded thereon. The welds along interface between the old flight bar and replacement tips were, typically, linearly extending welds, running in a plane co-extensive with the conveying direction. It was found that the forces occurring between the flight bar and the welded-on tips caused high stress areas in the welds and caused the tips to fracture and break off in subsequent service. In addition, the profiles of the endpiece inserts had to be finally shaped by welding deposition to match the original tip profile and this feature proved to be both costly and unsatisfactory due to the inability to consistently reproduce the original tip profile.

The present invention solves the problems heretofore encountered by providing a method of repairing worn flight bars in an economical manner which produces refurbished flight bars having substantially the same tip profiles as newly manufactured flight bars. In addition, the present invention provides a repair method for producing refurbished flight bars having end pieces that will better withstand mining conditions so as to increase the life of the repaired flight bar. Still further, the present invention contemplates a method of repairing flight bars which provides a welding plane configuration which better distributes the loading forces imposed on the flight bar during operation so as to minimize weld fracture problems. In addition, the present invention provides a method of repairing flight bars in a fast and economical manner which includes the use of shaped surfaces on the flight bar and replacement endpieces which fit together in a self-aligning manner for ease in welding, while also assuring reproducible dimensional tolerance control.

SUMMARY OF THE INVENTION

Briefly, the present invention is directed to a method of repairing a worn flight bar and the refurbished flight bar made in accordance therewith. The method of the invention comprises the steps of: (a) cutting the endpieces from opposed ends of the worn flight bar to form a cut surface at each end having a non-linear configuration in plan view and preferably having a prescribed angular inclination of, for example, about 5 degrees relative to a horizontal plane; (b) providing a pair of preformed, profiled replacement endpieces, preferably made by drop forging, each of the replacement endpieces having an outer surface contour substantially conforming to that of a new flight bar endpiece and having an inner face profile substantially corresponding to that of the cut flight bar ends; (c) aligning the preformed endpieces at the respective inner faces in contact with the cut ends of the flight bar in a holding fixture; (d) welding the endpieces along the joined faces; and (e) finish grinding the weld area and gauging to finished size.

DETAILED DESCRIPTION OF THE INVENTION

Figure 1:
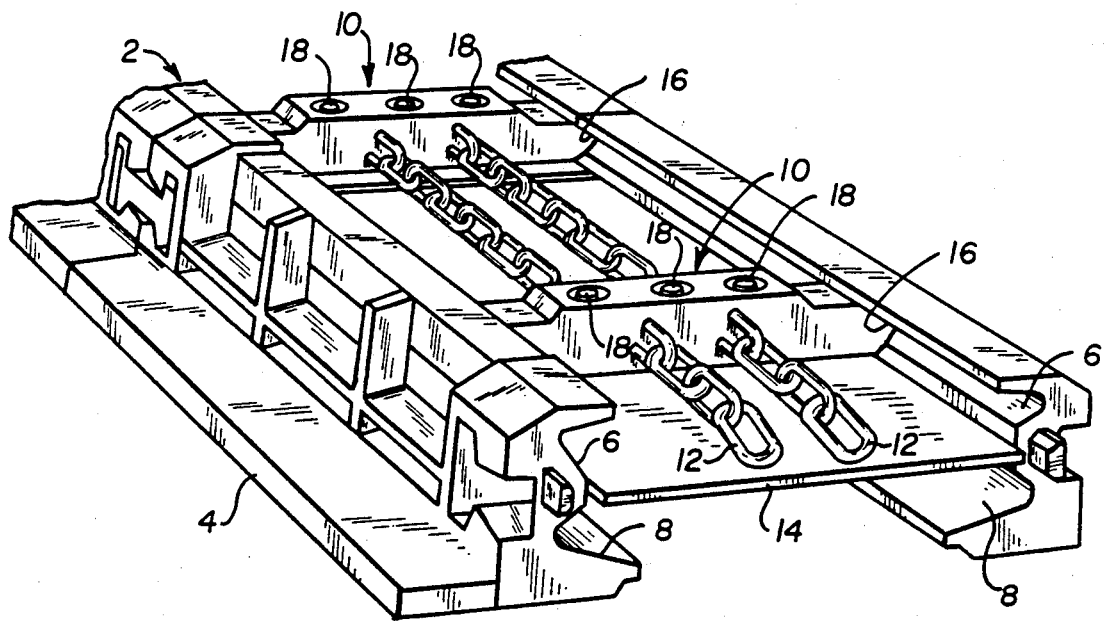
FIG. 1 is a perspective view of a section of a chain scraper line pan having flight bars of the type with which the present invention is concerned.

Referring now to the drawings, like elements are identified by the same reference numerals throughout the various figures. The invention is concerned with the repair of flight bars commonly used in chain scraper conveyors of the type depicted in FIG. 1. A line pan or armored face conveyor (AFC) generally designated 2 is made up of a plurality of interconnected line segments 4 which contains contoured side guides consisting of an upper profiled guide 6 and a lower profiled guide 8, commonly referred to as a sigma section due to their resemblance in cross-section to the Greek letter of the same name. Armored faced conveyors are commonly used in mining operations such as longwall coal mining to transport coal from the shearing face of the coal seam to other remote conveyor systems for removal of the coal from the mine. The mined coal is moved along the line pan 2 by a plurality of spaced-apart flight bars 10 which are interconnected by chains 12. The flight bars are slidably moved along flat pan decking 14 by the attached chains which are driven by powerful motors (not shown). The ends of the flight bars 16 are specially profiled to slidably fit within the contoured upper guide 6 of the sigma section as the mined coal is dragged along the flat pan decking 14 by the moving flight bars 10. After the coal is dumped into a remote conveyor, or like receiving station, the empty train of flight bars loop around a sprocket (not shown) and return in the run located beneath the pan 14, sliding within the lower guides 8 of the sigma section. Through heavy usage and extremely arduous service conditions, the tremendous amount of sliding contact between the profiled ends 16 of the flight bars and the sigma sections 6 and 8 of the line pans gradually causes wear at the profiled ends 16 of the flight bars. This continues to a point where the contours of the ends 16 no longer match the contours of the sigma sections 6 and 8. This problem is accelerated due to the fact that the sigma sections of the line pan are commonly made harder than the steel material of the flight bars so as to prevent excessive wear to the more expensive line pan components.

Figure 4:
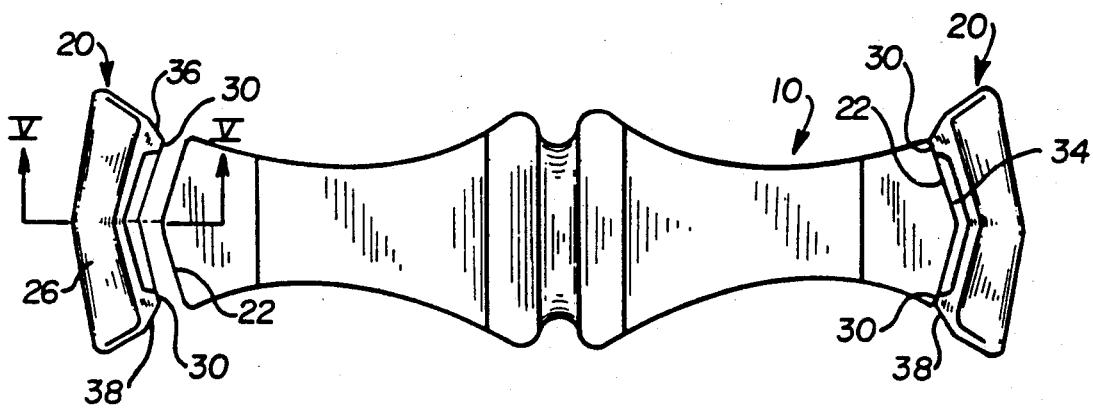
FIG. 4 is a top plan view of a flight bar similar to that of FIG. 2, showing the replacement endpieces of FIG. 3 adjacent thereto.

When wear to the softer flight bar ends becomes so severe, the chain conveyor can become damaged or inoperable due to misalignment problems. At this point, the worn flight bars 10 and chain assembly 12 are removed from the AFC 2. According to the present invention, the worn flight bars 10 are then disassembled from the chains by removing the bolts 18 which fasten the flight bars to the chains. After disassembly from the chains 12, the worn flight bars 10 are sand blasted to clean rust and dirt therefrom. The sand blasted flight bars are then visually inspected for cracks. If cracks are detected, the parts are scrapped, leaving only sound flight bars for subsequent refurbishment, according to the invention. The sand blasted and inspected flight bars are then placed in a holding fixture, for example, three flight bars at a time, and the worn tips 16 are removed by cutting in an oxy-acetylene or similar cutting machine. The cutting torches follow a specific path programmed to follow a template profile tracked by an electric eye. The shape of the cut is preferably in plan view in the shape of an outwardly extending "V", as seen in FIG. 4, and identified by reference numeral 22. The "V"-shape profile 22 presents a non-linear shape relative to a plane coincident to the conveying direction of the flight bar 10 and serves to counteract conveying forces. While the "V"-shaped profile 22 shown in FIG. 4 is depicted in the drawing as nearly symmetrical, it is understood that the cut profile 22 may also be configured in the form of a non-symmetrical "V"-shape; in a curved shape; in a "Z"-shape or like non-linear shape.

Figure 5:
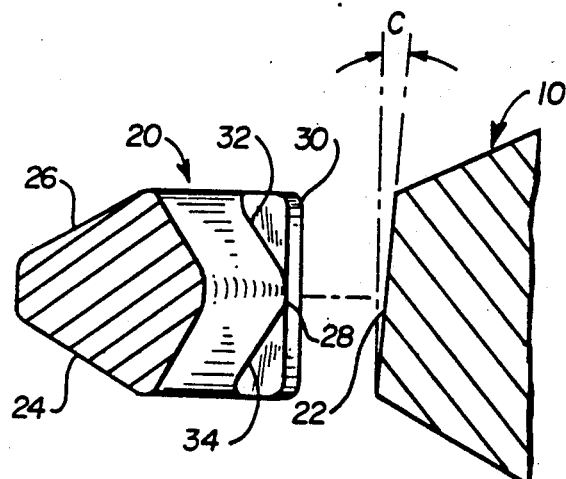
FIG. 5 is an enlarged cross-sectional view taken along line V—V of FIG. 4.
Figure 3:
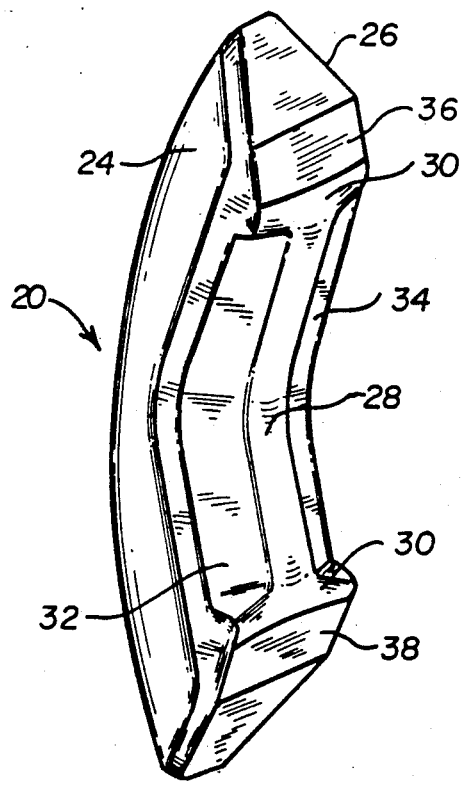
FIG. 3 is an enlarged perspective view of a replacement endpiece of the present invention.
Figure 2:
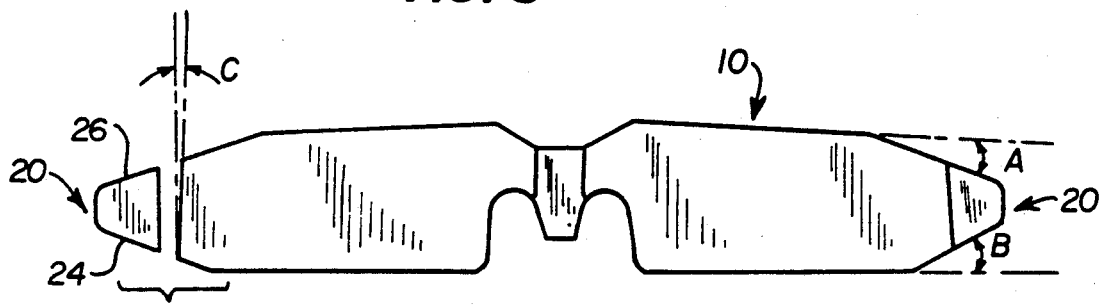
FIG. 2 is a side view of a typical flight bar showing the ends cut off with replacement endpieces adjacent thereto in accordance with the invention.

Further, the worn tip 16 is cut from the flight bar 10 at a slightly inclined vertical angle which is designated "C" in FIGS. 2 and 5. As seen in FIG. 2, the typical flight bar commonly has a side profile shape in which the lower planar profile at the end portion assumes an angle "B", while the upper planar profile of the end portion assumes a different angle "A". A common flight bar end profile may be represented by angle A equal to 20 degrees and angle B equal to 30 degrees. In such a situation, the worn endpiece is cut from the flight bar 10 at an angular inclination where C equals 5 degrees, for example. This permits the use of a replacement endpiece 20 having a generally symmetrical, cross-sectional shape, being joined thereto. Thus, only one symmetrically configured endpiece 20 need be stocked to accommodate various angles "A" and "B". Only the angularity "C" of the end cut need be modified to satisfy the particular flight bar side planar profile requirements.

The replacement endpieces generally designated 20, are constructed of a ferrous material similar in properties to that of the original flight bar 10, and are preferably produced by a drop forging process to insure ductility and toughness in the finished part. In some applications, however, a cast replacement endpiece 20 is suitable. The replacement endpieces 20 may also be made slightly harder than the body of the flight bar 10. More particularly, one type of flight bar 10 may have a hardness of less than about 40 Rockwell "C" hardness in which case the replacement endpieces 20 preferably are processed to have a slightly higher hardness of, for example, between 40 to 45 Rockwell "C" so as to exhibit improved wear characteristics and yet possess a hardness value lower than that of the sigma sections 6 and 8 of the AFC 2 so as to prevent undue wear to the sigma section.

The repair endpiece 20 has outer face profiles 24 and 26 which conform substantially to the profile of the original flight bar ends 16 which insures a proper fit within sections 6 and 8 of the AFC. Each replacement endpiece 20 has an inner face 28 formed with a profile closely matching that of the "V"-shaped profile 22 cut on the ends of flight bar 10. The opposed end portions of the profiled inner face 28 have transversely extending land areas 30 which act as alignment surfaces to insure proper seating and prevent lateral rocking between the replacement endpieces 20 and the flight bar 10 when the parts are fitted together prior to welding as shown in FIG. 4. The seating lands 30 provide a transverse land or seating surface between the endpiece 20 and engage the flat vertical surface of the cut face 22 as shown in FIG. 5. A pair of chamfered surfaces 32 and 34 are also formed along both sides of the profiled inner face 28 preferably during the drop forging or casting operation. Chamfered surfaces 36 and 38 are also provided on the narrow ends of the replacement endpiece 20.

The cut, sand blasted and inspected flight bar 10 is placed in a holding fixture or welding jig (not shown) and the replacement endpieces 20 are located at adjoining respective cut end portions 22 of the flight bar. The assembly is then joined under compressive force by moveable hold-down jaws located at the extremities of the welding fixture. The transverse land portions 30 of the endpieces provide a stable alignment surface to insure that there is no unwanted shifting or lateral rocking movement between the pieces when they are compressibly mounted together in the welding fixture. Preferably, the pieces are initially tack welded in several places and then entirely welded, preferably by a MIG welding operation, using a high deposit welding wire applied to the chamfered areas 32, 34, 36 and 38 around the perimeter of the joined parts. After welding, the weld bead area is subjected to a cleaning operation, such as by conventional wire brushing and grinding, to achieve a smooth surface in the area of the deposited weld bead. A gauging device (not shown), having a profile matching that of the particular sigma guide section 6 of the line pan to be filled, is employed to insure that the final refurbished flight bar smoothly slides within the required profiled dimensions essential for proper operation of the particular AFC. The refurbished flight bars produced in accordance with the present invention are uniformly within the original equipment manufacturer's tolerances for AFC equipment and meet these objectives at a considerable cost savings over newly manufactured flight bars. The refurbished flight bars, according to the present invention, will perform as well as, if not better than, an original flight bar at appreciably lower cost.

What is claimed is:

1. A method of repairing worn flight bars used in chain conveyors of the type having profiled sigma sections for guiding similarly profiled flight bar end portions therethrough, the repair method comprising:
   a. cutting a worn end portion from each end of the flight bar to provide, in plan view, a non-planar surface configuration at each cut end, and at least one flat vertical surface in side view, said surface configuration being non-coincident with a plan coincident to a conveying direction of the flight bar;
   b. providing a replacement endpiece for each end of the flight bar, said replacement endpiece having a profiled outer surface substantially matching a profile geometry of an original flight bar end and having an inner face profile matching the surface configuration of the cut flight bar ends;
   c. positioning said cut flight bar and said profiled replacement endpieces in an aligned position wherein said inner faces of the profiled replacement endpieces are engaged by the respective cut ends of the flight bar; and
   d. welding said profiled replacement endpieces to the flight bar.

2. The method of claim 1 wherein the profiled replacement endpieces are provided with chamfered edges around said inner face for placement of a weld bead during said welding step.

3. The method of claim 1 including the steps of cleaning the weld area and gauging the finished flight bar.

4. The method of claim 1 wherein the surface configuration at each cut end of the flight bar is an outwardly extending "V"-shape and the inner faces of the respective replacement endpieces also have a matching inwardly extending "V"-shape.

5. The method of claim 4 wherein the inner faces of the respective endpieces have welding chamfers formed therearound and also include a transversely extending seating land positioned at opposed ends of the inner face, said seating lands seating against the flat vertical surface of the cut flight bar ends to provide stabilized alignment therebetween.

6. The method of claim 1 wherein the replacement endpieces are forged and have a hardness at least as great as said worn flight bar.

7. The method of claim 1 wherein the replacement endpieces are forged and have a hardness greater than a hardness of said worn flight bar and less than a hardness of said profiled sigma sections.

8. The method of claim 1 wherein the flat vertical surface at each of the cut ends of the flight bar is inclined at a predetermined angle relative to a horizontal reference plane whereby the welded replacement endpieces form upper and lower planar face profiles having different, predetermined angular relationships with the horizontal reference planes.

9. The method of claim 8 wherein the flat vertical surface at the cut ends of the flight bar is inclined at an angle of about 5 degrees relative to the horizontal and the upper and lower planar face profiles are configured at 20 degrees and 30 degrees, respectively, relative to the horizontal.

10. A method of repairing worn flight bars used in chain conveyors of the type having profiled sigma sections for guiding the ends of the flight bars therethrough, the repair method comprising:
    a. cutting a worn-end portion from each end of the flight bar to provide, in plan view, a cut surface at each end in the form of an outwardly extending "V"-shape;
    b. providing a replacement endpiece for each end of the cut flight bar, said replacement endpieces having a profiled outer surface substantially matching a profile geometry of an original flight bar end and having an inner face profile in the form of an inwardly extending "V"-shape substantially matching the shape of the cut ends of the flight bar;
    c. providing chamfered edges around the inner face of each of said profiled replacement endpieces.
    d. positioning and holding said cut flight bar and said profiled replacement endpieces in an aligned position wherein said "V"-shaped inner faces of the endpieces are engaged by the "V"-shaped cut ends of the flight bar; and
    e. welding said endpieces to the flight bar along said chamfered edges.

11. The method of claim 10 wherein the profiled replacement endpieces are formed by drop forging and have a hardness greater than the flight bar and less than the sigma sections.

* * * * *